Sept. 11, 1923.
H. NICOLARDOT
NONPUNCTURING AIR CHAMBER
Filed Jan. 12, 1922
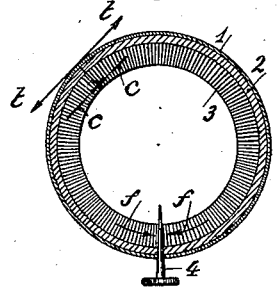
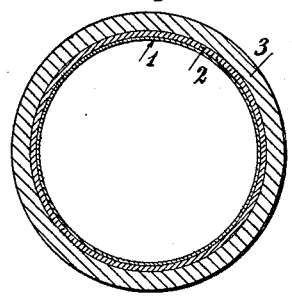
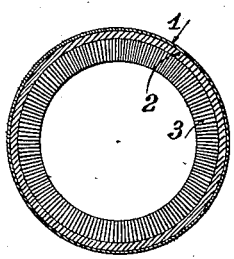
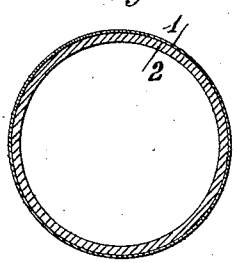
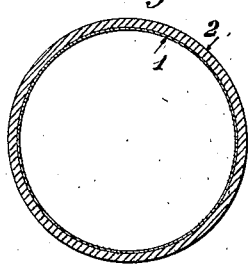
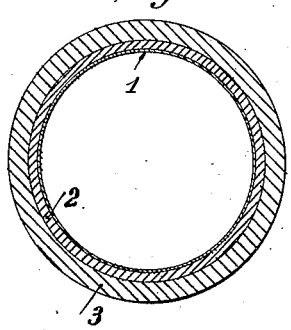

Patented Sept. 11, 1923.

1,467,557

UNITED STATES PATENT OFFICE.

HENRI NICOLARDOT, OF BOULOGNE-SUR-SEINE, FRANCE.

NONPUNCTURING AIR CHAMBER.

Application filed January 12, 1922. Serial No. 528,741.

*To all whom it may concern:*

Be it known that I, HENRI NICOLARDOT, residing at Boulogne-sur-Seine, 57 Rue des Tilleuls, France, have invented certain new and useful Improvements in Nonpuncturing Air Chambers, of which the following is a specification.

My invention relates to a method of construction and certain processes of manufacture of air chambers or like receptacles of India rubber which are of a non-puncturing character, thereby closing hermetically in case the walls should be pierced by a nail, for instance. The invention is essentially characterized in that the wall of the air chamber or receptacle is constituted by an external layer which is chosen and disposed in such manner as to resist efforts of traction, and by an internal layer of relatively large size which is normally in the compressed state. Should it happen that a nail passes through the said wall, for instance, the permanent compression prevailing within the substance itself—by reason of its constitution and method of manufacture—will upon the withdrawal of the nail cause the edges of the puncture to be brought together in an energetic manner whereby a perfectly tight joint shall be immediately formed.

The said construction may be carried into effect by a variety of means and by different methods of manufacture, and my invention is applicable to all such cases. A particular form of construction of an air chamber and a special process of manufacture will be set forth hereunder, but this is given solely by way of example.

In the accompanying drawings, Fig. 1 represents an air chamber according to the invention. Figs. 2 and 3 relate to a method of manufacture, and Figs. 4, 5 and 6 to a modified form of construction.

The air chamber which is herein described by way of example and shown in cross-section in Fig. 1, comprises an external layer 1 (of cloth fabric for instance) of sufficient strength to resist efforts of traction and especially in the tangential sense as shown by the arrows $t$ $t$; an intermediate layer 2 (for instance ordinary India rubber) which may be in multiple disposition or may be suppressed; and a relatively thick internal layer (preferably of India rubber of great elasticity) which is by reason of any suitable method of manufacture placed in a state of permanent compression, especially in the peripheral sense according to arrows $c$ $c$.

The process as described hereunder is set forth solely as an indication and in a diagrammatic manner, in order to show that I am able to obtain an air chamber whereof the various constituent layers will comply with the conditions above indicated. Upon a piece of textile fabric 1, Fig. 2, is applied a layer of ordinary rubber 2, then a thicker layer of very elastic rubber 3. By reversing the whole in such manner that the cloth 1 which formed the internal wall in Fig. 2 now constitutes the outer wall as in Fig. 3, it will be observed that if this cloth fabric is not extensible, or only slightly so, in the peripheral sense, since the layer 3 will now be caused to diminish its diameter and periphery, the material thereof will in this new position be subjected to an internal compression to a greater or less degree.

Figs. 4 to 6 show a modified form of construction. To an ordinary air chamber 2, Fig. 4, is cemented a piece of cloth fabric 1; then the whole is reversed as shown in Fig. 5 with the chamber 2 now at the exterior; upon the latter is applied the thick layer 3, Fig. 6, and lastly the whole is again reversed to bring the same into the position Figs. 1 and 3. It will be remarked that if a nail 4 should enter the air chamber which is thus constituted, as soon as the nail is withdrawn, and supposing of course that no appreciable amount of substance has been removed, the aperture will close up again and the edges of the puncture will come together in an energetic manner thus forming a tight joint, by reason of the internal effects of compression taking place within the material itself, as shown by the arrows $f$ $f$, Fig. 1.

It is obvious that the external layer 1 may be of any suitable nature such as cloth fabric, strong rubber, or the like, on the sole condition that it shall withstand the forces of traction or extension resulting from the internal compression forces of the compressed layer 3. The intermediate layer 2 may be suppressed, or again a plurality of such layers may be used, either homogeneous or heterogeneous. In like manner any suitable process of manufacture may be employed to obtain the characteristic construction as above indicated. My invention is applicable not only to air chambers but also to all receptacles of India rubber for containing liquids or gases. All that is necessary is that the outer layer 1 shall be enabled to withstand in an elastic manner or otherwise, the sole forces of traction arising from the permanent compression of the substance 3 of the walls. But if such forces should have added thereto other forces occasioned by the pressure of the contained fluid, it may prove useful or necessary to maintain the whole device by an external envelope of a stronger nature, after the manner in which the known air chamber is maintained within the envelope of a pneumatic tire.

Claims.

1. A pneumatic tire tube comprising an annular layer of elastic material which is maintained in a permanent state of compression, an inextensible annular layer of fabric enclosing said elastic material, the compression of said elastic layer being uniform at all points on the internal periphery of said fabric so that the tube retains its form independently of the casing in which it is placed.

2. A pneumatic tire tube comprising an annular layer of elastic material which is maintained in a permanent state of compression, an inextensible annular layer of fabric enclosing said elastic material, a layer interposed between said elastic layer and said fabric layer, the compression of said elastic layer being uniform at all points on the internal periphery of said fabric so that the tube retains its form independently of the casing in which it is placed.

In testimony whereof, I affix my signature to this specification.

HENRI NICOLARDOT.